United States Patent
Chu

(10) Patent No.: US 7,220,218 B1
(45) Date of Patent: May 22, 2007

(54) MODIFIED TRAMPOLINE HOLDER STRUCTURE

(76) Inventor: Arthur Chu, No. 23, Alley 3, Lane 1483, Chung Hwa Rd., Chu Pei City, Hsinchu (TW)

( * ) Notice: Subject to any disclaimer, the term of this patent is extended or adjusted under 35 U.S.C. 154(b) by 0 days.

(21) Appl. No.: 11/303,960

(22) Filed: Dec. 19, 2005

(51) Int. Cl.
*A63B 5/11* (2006.01)
*F16B 7/00* (2006.01)

(52) U.S. Cl. .................... 482/27; 482/28; 403/170; 403/217; 403/326

(58) Field of Classification Search ............ 482/27–29; 182/137–140; 403/169, 170, 217, 274, 326, 403/329
See application file for complete search history.

(56) References Cited

U.S. PATENT DOCUMENTS

| | | | | |
|---|---|---|---|---|
| 2,991,841 A * | 7/1961 | Sampson et al. | ............. | 482/27 |
| 3,767,192 A * | 10/1973 | Eriksson | ............. | 482/27 |
| 4,139,192 A * | 2/1979 | McNeil | ............. | 482/27 |
| 4,339,123 A * | 7/1982 | Rich | ............. | 482/28 |
| 4,381,861 A * | 5/1983 | Howell et al. | ............. | 482/27 |
| 6,413,004 B1 * | 7/2002 | Lin | ............. | 403/176 |
| 6,559,221 B2 * | 5/2003 | Sandor et al. | ............. | 524/547 |
| 2005/0143225 A1* | 6/2005 | Adams | ............. | 482/27 |

* cited by examiner

*Primary Examiner*—Jerome Donnelly
*Assistant Examiner*—Allana Lewin
(74) *Attorney, Agent, or Firm*—Rosenberg, Klein & Lee

(57) ABSTRACT

A modified trampoline holder structure comprises a plurality of transverse tubes, six connection sleeves, and three supporting tubes. The transverse tubes are connected together into a ring shape. Each connection sleeve firmly clamps the joint of two adjacent transverse tubes. Each connection sleeve is inserted into an end opening of one supporting tube. Locking bumps are formed at two sides of the inner edge of each tube clamping portion. Corresponding locking grooves are formed at two sides of the joint of two adjacent transverse tubes. When the tube clamping portion firmly clamps the joint of two adjacent transverse tubes, the locking bump and the locking groove will be locked together. Each insertion tube portion is composed of at least two arc-shaped sheets. Detents that can be locked together are formed on the two arc-shaped sheets.

12 Claims, 4 Drawing Sheets

MODIFIED TRAMPOLINE HOLDER STRUCTURE

BACKGROUND OF THE INVENTION

1. Field of the Invention

The present invention relates to a modified holder structure and, more particularly, to a modified trampoline holder structure of high safety and easy disassembly.

2. Description of Related Art

Nowadays, people do indoor sports much more than outdoor sports because of busy life styles and small living space. Therefore, indoor sports with a good exercise effect such as running, weight lifting, chest developing, trampoline jumping, and so on have become the mainstream sports at leisure times. Trampoline jumping can be used for medical rehabilitation. Because trampoline jumping can provide stimulus to the vestibule and body, train the jumping capability of the lower limbs, increase the harmony of action, promote the balance capability, and enhance the feel of rhythm, it is very suitable to development treatment, sensory integration training, and ordinary capability training.

As shown in FIG. 1, a prior art trampoline structure has a resilient sheet 10, which is spread at the center of a ring-shaped trampoline framework 14 by means of springs 12. The trampoline framework 14 is connected with supporting stands 16 by means of welding. Because the welding portions may easily rust during usage and the phenomenon of unsecured welding such as dry joints may arise, the above welding portions may easily break during usage to cause accidents or even to endanger the life of user. Furthermore, because the holder structure of a welded trampoline is fixed, the trampoline is difficult to disassemble and assemble and occupies a larger space to cause inconvenience in placing.

Accordingly, the present invention aims to propose a modified trampoline holder structure to solve the above problems in the prior art.

SUMMARY OF THE INVENTION

An object of the present invention is to provide a modified trampoline holder structure, in which transverse tubes, supporting tubes, and connection sleeves are assembled together to replace the conventional way of connection through welding. Moreover, detents and locking elements are provided on the connection sleeves to enhance the safety in use of the trampoline.

Another object of the present invention is to provide a modified trampoline holder structure, whereby the trampoline is easy to assemble and detach and convenient for storage after usage, hence saving space and increasing the convenience in use.

According to the present invention, a modified trampoline holder structure comprises a plurality of transverse tubes, at least six connection sleeves, and at least three supporting tubes. The transverse tubes are connected into a ring shape. Each connection sleeve has an insertion tube portion and a tube clamping portion. Each tube clamping portion firmly clamps the joint of two adjacent transverse tubes. Each insertion tube portion is inserted into at least an end opening of one of the supporting tubes to support the transverse tubes. Locking bumps are formed at two sides of an inner edge of each tube clamping portion, and corresponding locking grooves are formed at two sides of the joint of two adjacent transverse tubes. The locking bump and locking groove are locked together when the tube clamping portion firmly clamps the joint of two adjacent transverse tubes. Each insertion tube portion is composed of at least two arc-shaped sheets. Detents that can be locked together are formed on the two arc-shaped sheets. The detents on the two arc-shaped sheets are locked together when the insertion tube portion is inserted into the end opening of the supporting tube so that the tube clamping portion won't easily come off from the joint of two adjacent transverse tubes.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

The present invention proposes a modified trampoline holder structure, which adopts an assembly way instead of the conventional welding way to achieve high convenience in storage or placing. Moreover, many safety mechanisms such as detents and locking elements are provided on the assembly joints to enhance safety in use.

Figure 1:
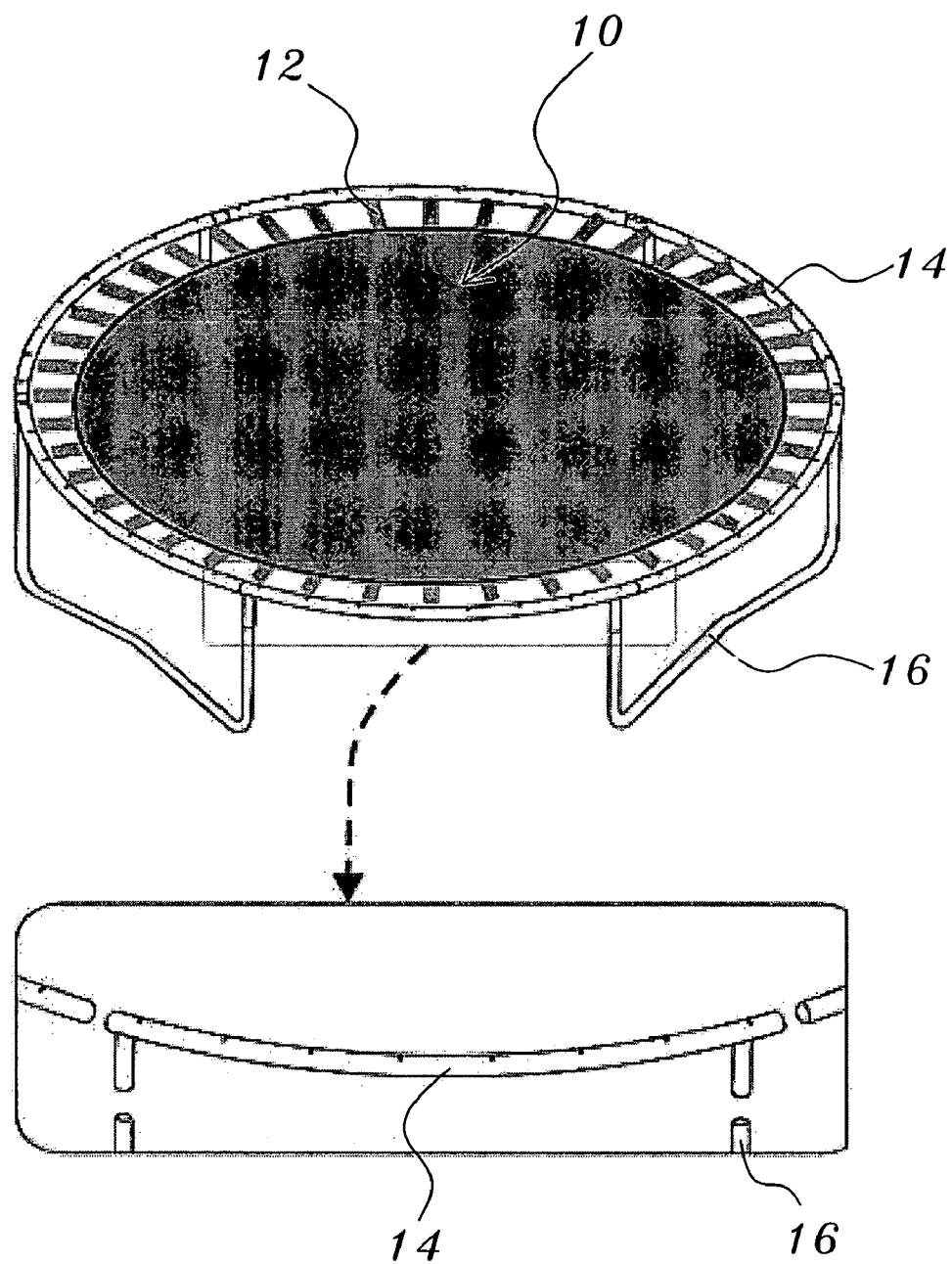
FIG. 1 is a perspective view of a prior art trampoline structure.
Figure 2:
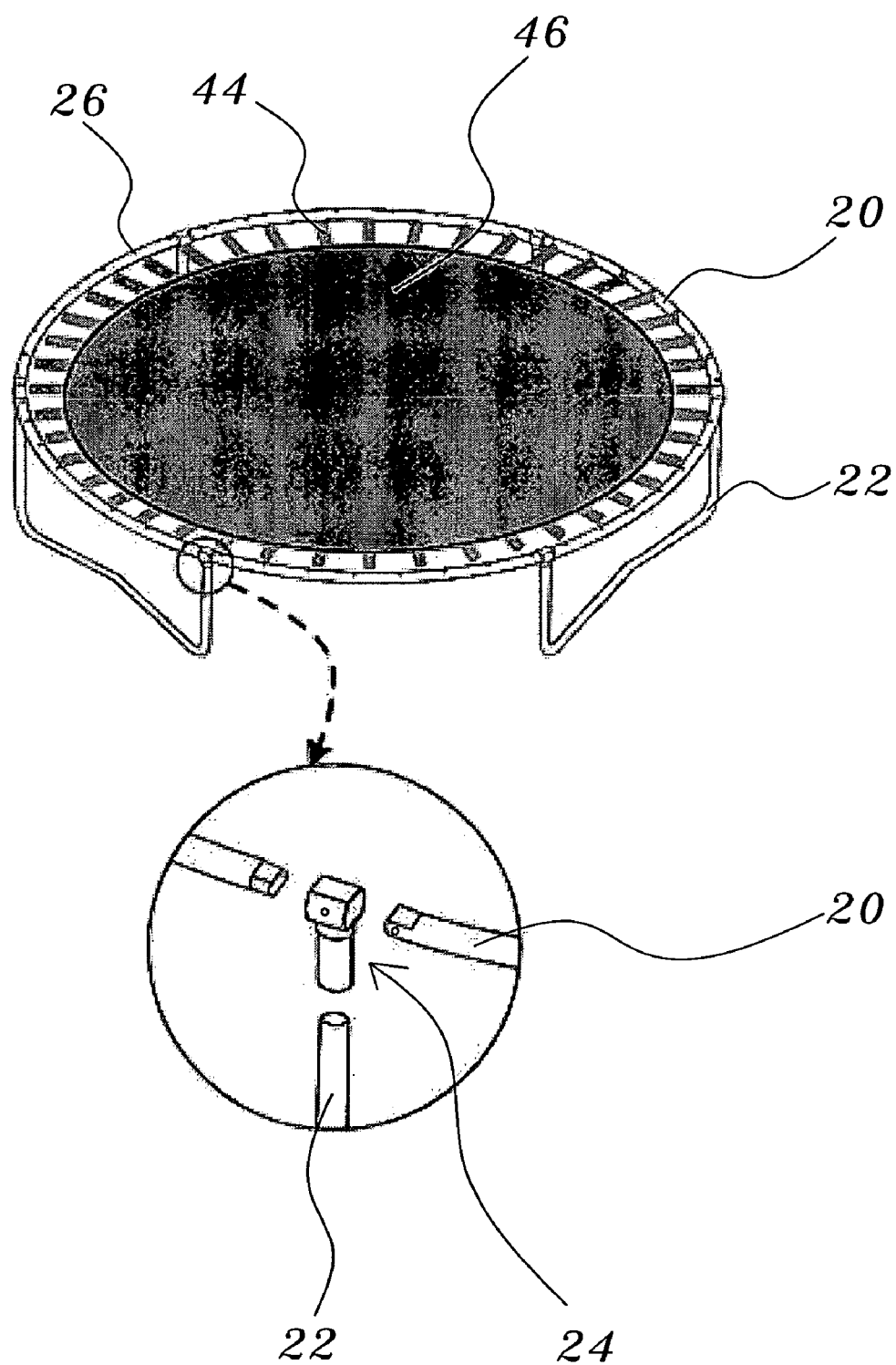
FIG. 2 is a perspective view of a trampoline structure of the present invention.
Figure 3:
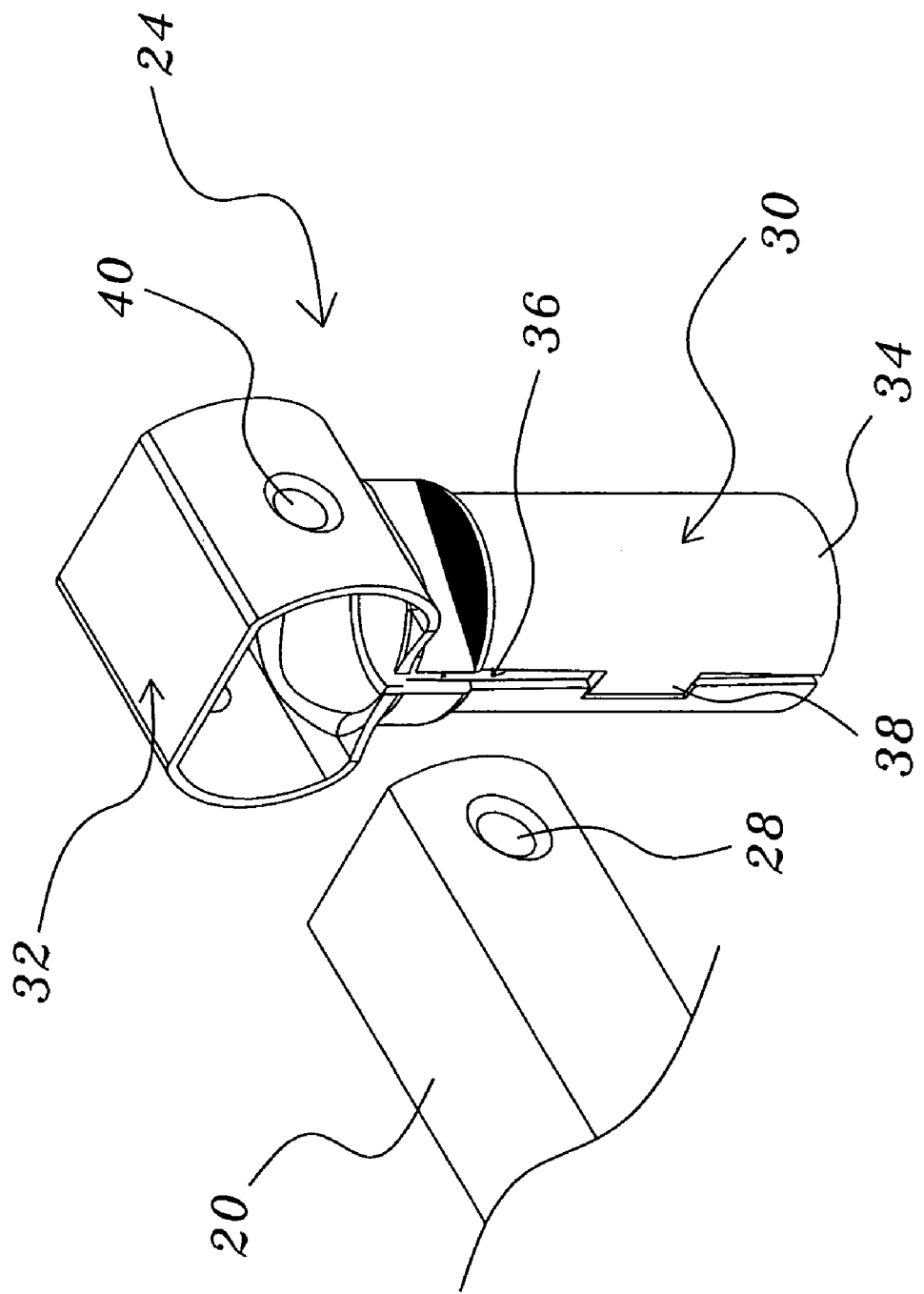
FIG. 3 is an exploded perspective view showing how a connection sleeve is assembled with a transverse tube of the present invention.

As shown in FIGS. 2 and 3, the trampoline holder structure is formed by assembling a plurality of transverse tubes 20, three supporting tubes 22, and six connection sleeves 24. Two ends of each transverse tube 20 are flat, and the diameter of one end of the transverse tube 20 is larger than that of the other end. These transverse tubes 20 can therefore be sleeved together to form a ring shape. Moreover, a plurality of holes 26 are provided on each transverse tube 20. Symmetric circular arc-shaped locking grooves 28 are provided on the end with a larger diameter of the transverse tube 20.

Each connection sleeve 24 has an insertion tube portion 30 and a tube clamping portion 32. The insertion tube portion 30 is composed of two arc-shaped sheets 34 with a gap 36 formed between them. The closer the gap 36 to the tube clamping portion 32, the larger the gap 36. That is, the gap 36 is V-shaped. Detents 38 that can be locked together are provided on the two arc-shaped sheets 34. In this embodiment, the detents 38 are bow-shaped. But the detents 38 can also be sawtooth-shaped. The tube clamping portion 32 of the connection sleeve 24 is flat. Two grooves 40 are disposed at two outsides of the tube clamping portion 32 so that two circular arc-shaped locking bumps 42 are formed at two sides of the inner edge of the tube clamping portion 32. The supporting tube 22 is U-shaped. Each end opening of the supporting tube 22 can receive the insertion tube portion 30 of one of the connection sleeves 24.

Figure 4:
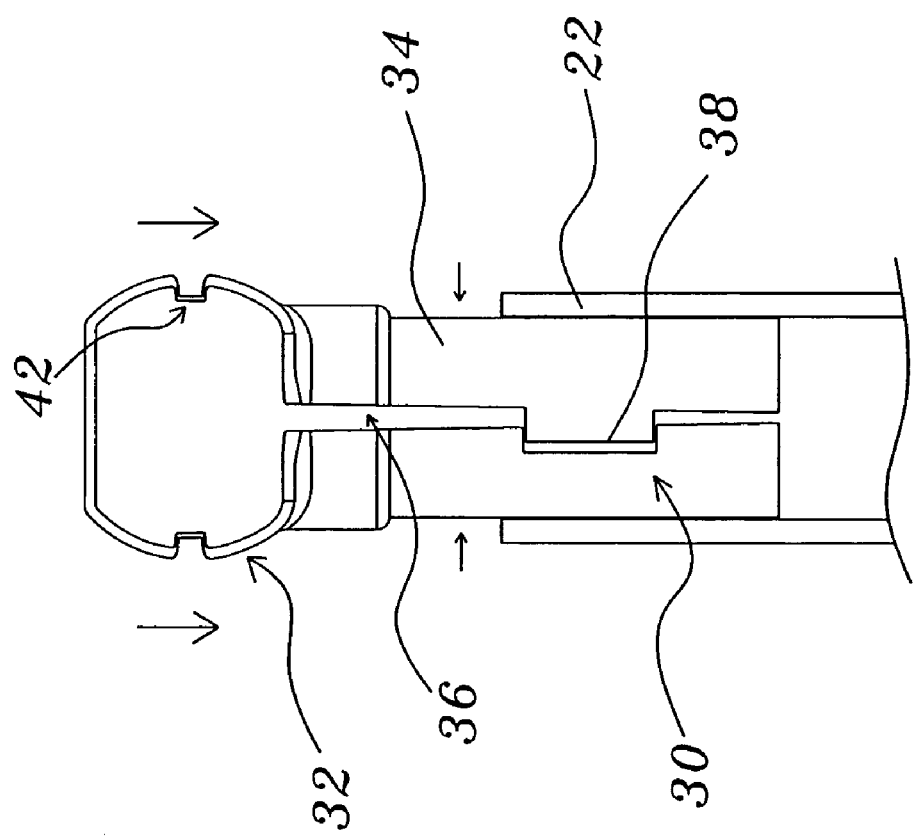
FIG. 4 is a diagram showing how a supporting tube is assembled with a connection sleeve of the present invention.

As shown in FIG. 4, two ends of each transverse tube 20 are respectively sleeved into the tube clamping portions 32 of the connection sleeves 24 so that the transverse tubes 20 can be sleeved together to form a ring shape. The tube clamping portion 32 of each connection sleeve 24 is sleeved with the joint of two adjacent transverse tubes 20. The insertion tube portion 32 of each connection sleeve 24 is inserted into one end opening of one of the supporting tubes 22 to support the transverse tubes 20. When each insertion tube portion 30 is inserted into one end opening of one of the supporting tubes 22, the gap 36 on the insertion tube portion 30 will gradually diminish and simultaneously shrink the diameter of the tube clamping portion 32. The two locking bumps 42 at the inner edge of the tube clamping portion 32 and the locking grooves 28 of the transverse tube 20 are therefore locked together to clamp and fix the joint of two adjacent transverse tubes 20. Moreover, when each insertion tube portion 30 is inserted one end opening of one of the supporting tubes 22, the detents 38 on the two arc-shaped sheets 34 will lock together. The assembly of this trampoline holder structure is thus formed.

Finally, a resilient sheet is disposed in the trampoline holder structure. The resilient sheet is composed of a plurality of resilient elements 44 and a cloth sheet 46. The resilient elements 44 are springs. One end of each resilient element 44 is connected with a hole 26 on one of the transverse tubes 20, and the other end is connected with the cloth sheet 46. The cloth sheet 46 can thus be spread to finish the setup of the trampoline resilient sheet.

The present invention assembles transverse tubes, supporting tubes, and connection sleeves into a trampoline structure to replace the conventional welding way. Safety mechanisms are provided on the trampoline structure to avoid the situation of coming off. In the embodiment, detents and locking elements are provided on the connection sleeves to enhance the safety in use. Besides, because the trampoline structure is easy to assemble and disassemble and convenient for storage after usage, the space can be saved and the convenience in use can be enhanced.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A modified trampoline holder structure comprising a plurality of transverse tubes, at least six connection sleeves, and at least three supporting tubes, said transverse tubes being connected together into a ring shape, each said connection sleeve having an insertion tube portion and a tube clamping portion, each said tube clamping portion firmly clamping a joint of two adjacent said transverse tubes, each said insertion tube portion being inserted into at least an end opening of one of said supporting tubes to support said transverse tubes, locking bumps being formed at two sides of an inner edge of each said tube clamping portion, corresponding locking grooves being formed at two sides of the joint of two adjacent said transverse tubes, said locking bump and said locking groove being locked together when said tube clamping portion firmly clamps the joint of two adjacent said transverse tubes, each insertion tube portion being composed of at least two arc-shaped sheets, detents that can be locked together being formed on said two arc-shaped sheets, said detents on said two arc-shaped sheets being locked together when said insertion tube portion is inserted into the end opening of said supporting tube so that said tube clamping portion won't easily come off from the joint of two adjacent said transverse tubes.

2. The modified trampoline holder structure as claimed in claim 1, wherein a plurality of holes is disposed on said transverse tubes and used to install a resilient sheet when said transverse tubes are connected together into a ring shaped.

3. The modified trampoline holder structure as claimed in claim 2, wherein said resilient sheet is composed of a plurality of resilient elements and a cloth sheet, one end of each said resilient element is connected with one of said holes of said transverse tubes, and the other end is connected with said cloth sheet.

4. The modified trampoline holder structure as claimed in claim 3, wherein said resilient elements are springs.

5. The modified trampoline holder structure as claimed in claim 1, wherein a gap is formed between said two arc-shaped sheets, and said gap diminishes to simultaneously shrink the diameter of said tube clamping portion when said insertion tube portion is inserted into one end opening of said supporting tube so as to clamp and fix the two ends of said transverse tube and make said detents on said two arc-shaped sheets be locked together.

6. The modified trampoline holder structure as claimed in claim 1, wherein said transverse tubes are connected together in a sleeving way.

7. The modified trampoline holder structure as claimed in claim 1, wherein the two ends of said transverse tube are flat, and the diameter of one end of said transverse tube is larger than that of the other end.

8. The modified trampoline holder structure as claimed in claim 1, wherein said supporting tubes are U-shaped.

9. The modified trampoline holder structure as claimed in claim 1, wherein said tube clamping portion of said connection sleeve is flat.

10. The modified trampoline holder structure as claimed in claim 1, wherein said locking bump is provided by forming a groove at an outside of said tube clamping portion.

11. The modified trampoline holder structure as claimed in claim 1, wherein said locking bump is circular arc-shaped.

12. The modified trampoline holder structure as claimed in claim 1, wherein said detents of said two arc-shaped sheets are bow-shaped or sawtooth-shaped.

* * * * *